(12) United States Patent
Peyrucain et al.

(10) Patent No.: US 8,666,566 B2
(45) Date of Patent: Mar. 4, 2014

(54) AIRCRAFT CONTROL SYSTEM CONTAINING AN AERONAUTICAL DATA BASE

(75) Inventors: Eric Peyrucain, Saint-Genies (FR); Andre Bourdais, Toulouse (FR); Thomas Sauvalle, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 1364 days.

(21) Appl. No.: 11/942,570

(22) Filed: Nov. 19, 2007

(65) Prior Publication Data

US 2008/0119972 A1    May 22, 2008

(30) Foreign Application Priority Data

Nov. 21, 2006  (FR) ...................................... 06 10161

(51) Int. Cl.
    *B64C 19/00*    (2006.01)
(52) U.S. Cl.
    CPC ...................................... *B64C 19/00* (2013.01)
    USPC ................................ 701/3; 701/14; 244/99.2
(58) Field of Classification Search
    USPC .......................................................... 701/14
    See application file for complete search history.

(56) References Cited

U.S. PATENT DOCUMENTS

| | | | | |
|---|---|---|---|---|
| 5,968,106 | A * | 10/1999 | DeVlieg et al. | 701/70 |
| 6,173,159 | B1 * | 1/2001 | Wright et al. | 455/66.1 |
| 6,438,468 | B1 * | 8/2002 | Muxlow et al. | 701/3 |
| 7,690,603 | B2 * | 4/2010 | Peyrucain et al. | 244/183 |
| 7,715,955 | B2 * | 5/2010 | Tatham et al. | 701/16 |
| 2001/0037166 | A1 * | 11/2001 | Block | 701/14 |
| 2004/0059497 | A1 * | 3/2004 | Sankrithi | 701/120 |
| 2004/0245408 | A1 * | 12/2004 | Peyrucain et al. | 244/183 |
| 2005/0039006 | A1 * | 2/2005 | Stelling et al. | 713/170 |
| 2005/0090978 | A1 * | 4/2005 | Bathory et al. | 701/213 |
| 2006/0167619 | A1 * | 7/2006 | Arethens | 701/120 |
| 2007/0050101 | A1 * | 3/2007 | Sacle et al. | 701/11 |
| 2010/0256840 | A1 * | 10/2010 | Call et al. | 701/17 |

OTHER PUBLICATIONS

National Search Report of French application No. 0610161, dated Jun. 28, 2007; Yosri, Samir.

* cited by examiner

*Primary Examiner* — Shelley Chen
(74) *Attorney, Agent, or Firm* — Ingrassia Fisher & Lorenz, P.C.

(57) ABSTRACT

The invention relates to an aircraft control system containing several aircraft control computers (14, 16, 18, 20) for said aircraft, said system having at least one server (10) which:
- contains at least one aeronautical data base (12);
- is connected to at least one subassembly of said control computers through data transmission links (26a, 26b, 26c, 26d);
- is able to supply information from said at least one aeronautical data base to the computers of said control computer subassembly, said at least one server being able to supply information from said at least one aeronautical data base to a computer of said control computer subassembly, in a period of time less than a predetermined duration, upon request from said computer, when said information is not available in a local data base of said computer.

9 Claims, 2 Drawing Sheets

AIRCRAFT CONTROL SYSTEM CONTAINING AN AERONAUTICAL DATA BASE

CROSS-REFERENCE

The present application claims priority to French Patent Application No. 06 10161 filed on Nov. 21, 2006, the entirety of which is incorporated herein by reference.

FIELD OF THE INVENTION

This invention relates to an aircraft control system containing several aircraft control computers using information recorded in data bases. The invention also relates to an aircraft containing such a control system.

BACKGROUND OF THE INVENTION

It is known that an aircraft, in particular a modern civil transport plane, has several control computers intended to make possible the automation of certain aircraft control and/or navigation tasks. Among these computers, we could mention in particular the FMS type (Flight Management System, in English) flight management computers, the OANS type (On-board Airport Navigation System, in English) airport navigation computers, the ADIRS type (Air Data Inertial Reference System, in English) computers able to supply aircraft position information, as well as environment surveillance computers. The latter provide, in particular, land proximity warning functions of the following types: GPWS (Ground Proximity Warning System, in English), EGPWS (Enhanced Ground Proximity Warning System, in English) or TAWS (Terrain Awareness and Warning System, in English), and warning functions of the TCAS type (Traffic alert and Collision Avoidance System, in English) about the risk of collision with another aircraft, radar surveillance, etc. Several of said functions can be grouped in an AESS type (Aircraft Environment Surveillance System) environment surveillance computer. These various computers contain each at least one aeronautical data base. For example, an OANS type computer has a data base containing at least airport mapping information, an AESS type computer has a data base that contains at least information about land topography, etc. Each computer has a storage capacity able to store said data base(s) of said computer. The storage capacity is defined when the computer is designed. This capacity is selected as a function of the number of entries contained in said data base(s), plus a margin that makes it possible to increase said number of entries in the future. This margin is, in general, determined as a function of the increase projections of said number of entries, and as a function of the storage capacity of the memories available when the computer is designed. However, the experience shows that the increase in said number of entries is often higher than expected and after several years, the storage capacity of said memory may prove to be insufficient to receive the complete data base(s). Since the control computers are computers on-board an aircraft, they must be subjected to certification by the competent authorities (FAA in the United States, JAA in Europe, etc.) and therefore it is hard to consider modifying the storage capacity of said memory for a specific computer, due to certification restrictions. In addition, a modification of the memories of the control computers would be complex and costly to implement on the entire fleet of aircrafts. Consequently, it would be necessary to adopt costly data filtering operations to limit the data base(s) to the strictly necessary data.

In addition, some of said control computers use specific data base formats, defined by each computer manufacturer. When the data bases are updated, the airlines must acquire updated data bases exclusively from the manufacturers of said computers. This leads to high update costs, due to the lack of competition.

Moreover, since the information contained in the various data bases intervenes in the aeronautic operations, the airlines must have the competent authorities certify their processes for ground processing of the updates for each of said data bases. For each data base, it is necessary to prove that the quality level of ground processing is higher than a minimum quality level, which is very expensive. The higher the number of control computers containing data bases, the more expensive.

On the other hand, the various data bases must be updated frequently (every 28 days for some data bases) for the entire fleet of each airline. In general, an airline only has a few days to perform the updates on all the aircrafts in its fleet. Consequently, each airline has very little time to perform the data base updates. Therefore, the time to load the updates in the various computers is critical, especially as the number of entries in each data base is very high. When an airline receives from its suppliers the updates for the various data bases, it performs a verification of the quality of the data contained in these updates. When a problem is detected, this makes the time for recharging the data bases in the various control computers even more critical.

Certain information must be used by several of said control computers. Consequently, they must be included in the corresponding data bases for each of the computers concerned. For example, information corresponding to the position of a landing runway threshold is used by the computers of the FMS type, the OANS type and the AESS type. Consequently, it must be duplicated in the data bases of the three above-mentioned computer types. Besides the use of the memory of said computers, duplicating this information can pose a risk of incoherence between the values of said entries used by various computers, if the corresponding data bases erroneously contain different values for some of said entries.

SUMMARY OF THE INVENTION

The object of this invention is to remedy the above-mentioned disadvantages. It relates to an aircraft control system containing several aircraft control computers for said aircraft. This control system has at least one server which:
  contains at least one aeronautical data base;
  is connected to at least one subassembly of said control computers through data transmission links; and
  is able to supply information from said at least one aeronautical data base to the computers of said control computer subassembly, upon request of said control computers, through said data transmission links.

This control system is remarkable in that said at least one server is able to supply information from said at least one aeronautical data base to a computer of said control computer subassembly, in a period of time less than a predetermined duration, upon request from said computer, when said information is not available in a local data base of said computer.

Thanks to the control system according to the invention, a control computer that needs some information from the data base can send a request to the server asking for the information, then receive the information within a period of time guaranteed less than said predetermined duration. Consequently, the control computers do not need to have each a data base, as in the prior art: therefore, this makes it possible to solve the problems relating to the storage capacity of the memory of the data bases in the control computers. In addition, these control computers do not need to be sized as a function of the size of a data base, which makes it possible to reduce considerably their complexity and their cost.

Furthermore, the airlines only need to have the competent authorities certify a single data loading process in the data base of said server. This is much more inexpensive than obtaining a certification for a data loading process in the data bases of each control computer.

On the other hand, when the information is used by several control computers, this information is recorded only once in the data base of said server. This makes it possible to have on this server a data base with a storage capacity less than the sum of the storage capacity of the data bases distributed in the various control computers. This reduction in the storage capacity also makes it possible to reduce the time required for loading the updates into the data bases on the server. It also avoids any risk of discrepancy between the values of the same entry used by different control computers.

Furthermore, since the control system according to the invention contains a data base recorded on a server shared by several control computers, the manufacturers of said control computers cannot impose each a specific data base format. The format of said data base recorded on this server is defined by the aircraft manufacturer and the airlines can therefore acquire the data base updates from several rival suppliers.

Another advantage of the control system according to the invention comes from the fact that the storage capacity of a server can be easily increased, for example by adding an additional memory card, which makes it possible to adapt easily to increases in the size of the data base over time.

Preferably, said control computers are part of the group that contains the following computers:
flight management computer;
airport navigation computer;
environment surveillance computer;
ADIRS type computer.

The data transmission links can be in particular of the ARING 429 type or the AFDX type, frequently used in aeronautics.

Advantageously, said at least one server is linked to a data loading device able to supply it with updates of said at least one aeronautical data base.

Also advantageously, said at least one server is linked to radio communication reception means able to receive updates of said at least one aeronautical data base through digital data links.

In one form of embodiment, said at least one server contains means able to perform a differential update of said at least one aeronautical data base. This is advantageous since only the information modified in the data base is loaded on the server, which makes it possible to reduce the required loading time during an update.

In one particular embodiment of the invention, at least one control computer of said control computer subassembly has a local data base.

Preferably, said at least one server is able to supply at least one subassembly of said at least one aeronautical data base, upon request from said at least one control computer, so as to allow the loading of the local data base of said control computer.

In a preferred embodiment of the invention, the control system has several servers and:
each of said servers is connected:
to an associated subassembly of control computers through the main data transmission links; and
to control computers external to said associated subassembly through the secondary data transmission links;
the various associated control computer subassemblies linked to the various servers through the main data transmission links are different from one another; and
each secondary data transmission link between a server and a control computer is redundant for a main data transmission link between another server and said control computer.

Therefore, under normal operating conditions, a control computer sends requests and receives information from a data base of a server to which it is connected through a main data transmission link. In case of an outage of said server, the system can be reconfigured so that the control computer sends requests and receives information from a data base of another server to which it is connected through a secondary data transmission link. This makes possible the continuous operation of the control system in case of an outage of a server. In addition, under normal operating conditions, the work load is distributed among several servers, which makes it possible to reduce the response time when a request is made by a control computer.

The invention also relates to an aircraft containing a control system as mentioned above.

BRIEF DESCRIPTION OF THE DRAWINGS

The invention will be better understood upon reading the following description and examining the attached figures.

DETAILED DESCRIPTION OF THE PREFERRED EMBODIMENTS

Figure 1:
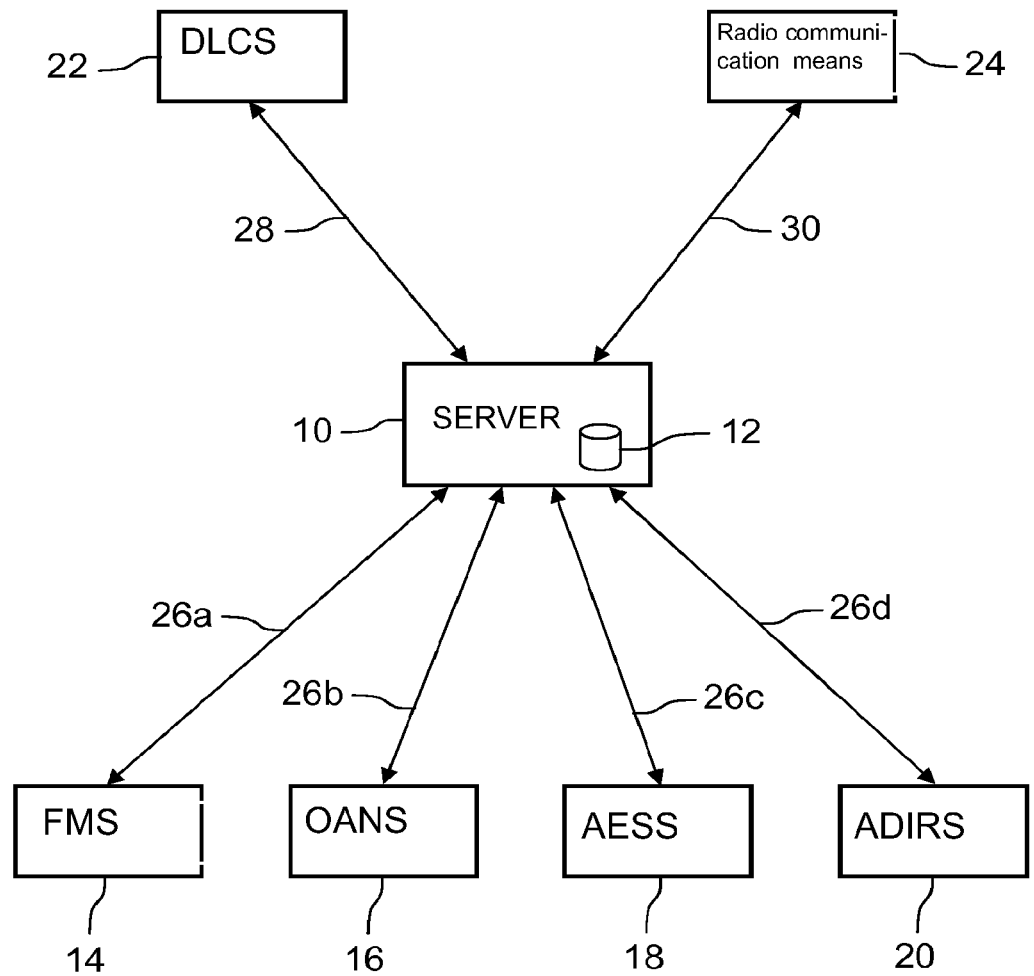
FIG. 1 is a block diagram of an aircraft control system according to the invention.

FIG. 1 shows an aircraft control system according to the invention. This control system contains several aircraft control computers: an FMS type flight management computer 14, an OANS type airport navigation computer 16, an AESS type environment surveillance computer 18, and an ADIRS type computer 20. These computers are connected to a server 10 through the corresponding links 26a, 26b, 26c and 26d. These links can be, in particular, of the ARINC 429 type or the AFDX type. The server 10 contains an aeronautical data base 12. It is connected through a link 28 to a DLCS type (Data Loading and Configuration System) data loader 22. It is also connected through a link 30 to radio communication reception means 24 able to receive updates from said at least one aeronautical data base through digital data links ("datalink" in English). The control computers 14, 16, 18, 20, do not have a local data base. When one of said computers needs information from a data bank, it sends a request to the server 10 through the corresponding link 26a, 26b, 26c, 26d. The server 10 searches for the information corresponding to this request in its data base 12, and then it sends it to the control computer that issued the request. The server 10 has a real time operating system configured so that the response time for any request from a control computer is less than a predetermined duration. Insofar as the links 26a, 26b, 26c, 26d between the server and the control computers make it possible to guarantee a transmission time less than a predetermined duration (which is the case for the types of links normally used in aeronautics: ARINC 429, AFDX, etc.), it is possible to guarantee that the time required by a control computer to obtain the information contained in data bases is deterministic, in other words, it is less than a maximum predetermined value. This maximum value is selected as a function of the availability requirements for various information by the control computers. This maximum value can vary, depending on the types of information from the data base.

Advantageously, at start up, the control computers ask the server 10 to check that the various types of data required for their operation are available in the data base 12 of said server. For this purpose, the server 10 can, for example, send information corresponding to a reply compatibility index to the control computers.

Advantageously, the server 10 contains at least one connector, not shown, able to receive a memory expansion card (for example according to the PCMCIA standard) in order to make possible the adaptation of the memory of the server 10 to storage capacity of the data base 12.

The DLCS type data loader 22 can be used to update the data base 12. For this purpose, the device 22 contains a reader able to receive a removable medium (CD-ROM, DVD, etc.) containing an update of the data base. It also makes it possible to connect a portable computer able to transfer such an update. Each update is performed at the initiative of a maintenance operator, while the aircraft is on the ground. The data loader 22 transfers the update data to the server 10 through the link 28, and consequently, the server 10 updates the data base 12. Advantageously, the server 10 contains means able to perform differential updates of the data base (that is to say, only information modified with regard to the active version of the data base 12 will be updated). This way, only the information modified in the data base must be sent to the server 10. This makes it possible to considerably reduce the volume of information to be transferred by the data loader 22 to the server 10, and therefore to reduce the time required to update the data base.

As an alternative, the data base updates can be performed using information received by the aircraft through digital data links. For this purpose, the radio communication reception means 24 receive the update information for the aeronautical data base through digital data links. The reception means 24 send this information to the server 10 through the link 30. This information is stored on the server 10. The update of the data base 12 by the server 10 as a function of said information is performed only at the initiative of a maintenance operator who must first check the integrity of said information after identifying himself/herself with the help of an electronic key: this makes it possible to protect the active data base against malicious attempts or errors during the transmission of the information. This alternative to update the data base has the advantage of saving time, since the updating information is already stored in the server 10 when the maintenance operator authorizes their transfer to the data base 12. An airline can this way distribute data base updates to its entire fleet of aircrafts, through radio communication links, and the activation of the updates is performed very fast by the maintenance operators during aircraft stop-overs. Just like in the case of updates using the DLCS type data loader 22, it is possible to advantageously perform differential updates of the data base.

In a specific embodiment of the invention not shown in FIG. 1, instead of being connected to the server 10 through the link 30, the radio communication reception means 24 are linked to the data loader 22. Therefore, whatever the way the update is performed, the server 10 receives this update from said data loader 22.

In another specific embodiment of the control system according to the invention, at least some of the control computers 14, 16, 18, 20, contain a local data base not shown in FIG. 1. When one of said control computers needs some information contained in its local data base, it will look for this information in its local data base rather than send a request to the server 10. The data base 12 recorded on the server 10 is used to perform the updates of the various local data bases of the control computers. For this purpose, when a control computer is turned on, it sends a request to the server 10 to give the version number for the data base 12. If the version number of the data base 12 recorded on the server 10 is more recent than the version number corresponding to the local data base recorded on this control computer, the latter sends a new request to the server 10, asking it to sent an update of said local data base. The server 10 sends, then, an updated to said control computer through the corresponding link 26a, 26b, 26c, 26d, preferably in the form of a differential update. The local data base of a control computer contains only part of the aeronautical data base information required by the corresponding control computer. Only the information requiring high availability (in particular reduced access time) is recorded in said local data base, and the other information is recorded only in the data base 12 of the server 10. This way, given the reduced number of information recorded in the local data base, there is no problem with the storage capacity of the control computer.

Advantageously, the control computers can send requests to the server 10 to add information to the data base 12. For example, a control computer can request to add to the data base information entered by the aircraft pilots, such as a new point, a new beacon, a new route, etc.

Advantageously, the server 10 is able to manage in the data base 12 the information associated with a period of validity. Such information can be received by the aircraft in the form of notifications commonly called NOTAMs (Notice to Air Men). Preferably, these NOTAMs are received by the digital data links through the radio communication reception means 24, then they are sent to the server 10. These NOTAMs can correspond, in particular, to information on unavailable infrastructures on the ground (for example unavailability of a radio navigation beacon or closing of an airport runway) for a given period of time. In this case, during the said period of time, the server 10 does not inform the control computers of the existence of said infrastructures (beacon, runway, etc.) since they are not available.

Figure 2:
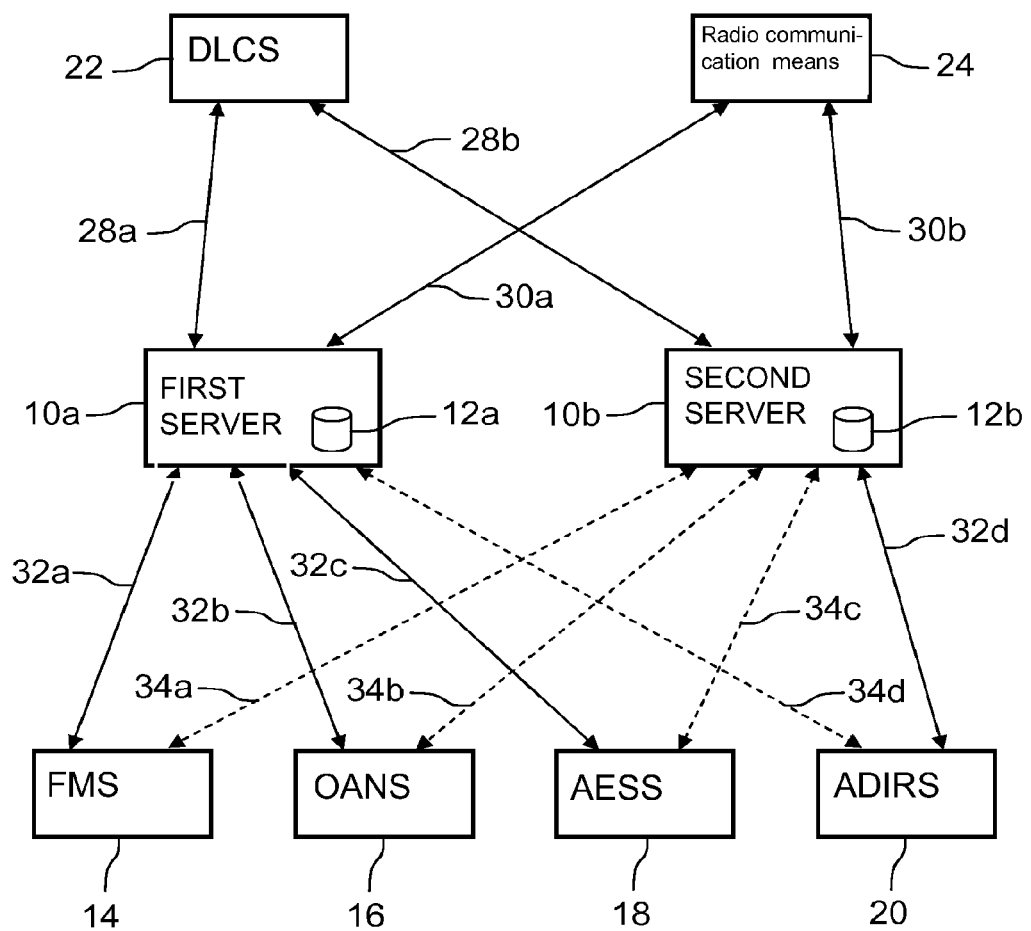
FIG. 2 is a block diagram of a preferred embodiment of an aircraft control system according to the invention.

In a preferred embodiment shown in FIG. 2, the control system according to the invention contains a first server 10a and a second server 10b, each containing an aeronautical data base 12a, 12b. The first server 10a is connected to the control computers of the FMS type 14, the OANS type 16, and the AESS type 18, through the main data transmission links 32a, 32b, 32c, and it is connected to the ADIRS type computer 20 through a secondary data transmission link 34d. The second server 10b is connected to the ADIRS type computer 20 through a main data transmission link 32d, and it is connected to the control computers of the FMS type 14, the OANS type 16, and the AESS type 18, through the secondary data transmission links 34a, 34b, 34c. On the other hand, the first server 10a is connected through a link 28a to a DLCS type data loader 22. It is also connected through a link 30a to radio communication reception means 24 able to receive updates from said at least one aeronautical data base through digital data links. The second server 10b is connected through a link 28b to the data loader 22 and through a link 30b to the radio communication reception means 24. In this preferred embodiment, each control computer is connected to one of the two servers through a main data transmission link and to the other server through a secondary data transmission link. The data bases 12a, 12b contained on each server 10a, 10b, are similar. This way, the control system corresponding to this preferred embodiment has a fail safe architecture both concerning the servers 10a, 10b and their data bases 12a, 12b, and concerning the data transmission links. Therefore, during normal operation, a control computer sends requests to a server to which it is connected through a main data transmission link and obtains in return the information requested from said server. The various main data transmission links are distributed between the servers so as to distribute the information supply tasks between these servers. In case of an outage of a server (or default of its data base), the control computers connected to this server through the main data transmission links will sent their requests to the other server through the corresponding secondary data transmission links, and in return, they will receive the requested information. In case of failure of a main data transmission link between a control computer and a server, this control computer sends the requests to the other server through the corresponding secondary data transmission link and receives, in return, the requested information.

The various data base update modes described with reference to FIG. 1 also apply to the preferred embodiment.

The previous description is not restrictive and it is possible to consider a higher number of servers and/or control computers, as well as various distributions of the main and the secondary data transmission links between the servers and the control computers, without going beyond the teaching of the invention. For example, it is possible to connect the computers performing tasks relating to aircraft navigation (FMS type flight management computer, OANS type airport navigation computer, ADIRS type computer) to a first server through the main data transmission links, and to a second server through the secondary data transmission links; the computers performing surveillance tasks (AESS type environment surveillance computer, etc.) are connected to this second server through the main data transmission links, and to the first server through the secondary data transmission links. This distribution makes it possible to segregate, on one hand, the navigation functions, and on the other hand, the surveillance functions.

The invention claimed is:

1. An aircraft control system containing several aircraft control computers for an aircraft, said system comprising:
 a first server and a second server each located on said aircraft, the first server connected to a first subassembly of said control computers through a plurality of primary data transmission links and the second server connected to a second, different subassembly of said control computers through a plurality of primary data transmission links, said first server:
  containing at least one aeronautical data base;
  upon request of a computer of said first subassembly of control computers, supplying information from said at least one aeronautical data base directly to the computer of said first subassembly of control computers in real-time, through a respective one of said plurality of primary data transmission links; and
  upon request from a computer of said first subassembly of control computers, supplying information from said at least one aeronautical data base to said computer of said first subassembly of control computers, in real-time, when said information is not available in a local data base of said computer of said first subassembly of control computers,
 wherein said several aircraft control computers comprise a flight management computer, an airport navigation computer, an environment surveillance computer, and an ADIRS computer, and said first subassembly of control computers comprises the flight management computer, the airport navigation computer and the environment surveillance computer, which are in communication with the first server through a respective one of the plurality of primary data transmission links.

2. The control system according to claim 1, wherein said data transmission links are one of an ARINC 429 and an AFDX.

3. The control system according to claim 1, wherein the second server includes at least one aeronautical data base and said first server and second server are linked to a data loader, said data loader supplying said first server and second server with updates of said respective at least one aeronautical data base.

4. The control system according to claim 3, wherein said first server and second server are linked to a radio communication receiver for receiving updates of said respective at least one aeronautical data base through digital data links.

5. The control system according to claim 1, wherein said first server contains a module for performing a differential update of said at least one aeronautical data base.

6. The control system according to claim 1, wherein at least one control computer of said first subassembly of control computers comprises a local data base.

7. The control system according to claim 1, wherein upon request from said at least one control computer of said first subassembly of control computers, said first server or said second server supplies at least one subassembly of said at least one aeronautical data base for loading the local data base of said control computer.

8. An aircraft containing a control system according to claim 1.

9. The control system according to claim 1, wherein a second subassembly of control computers comprises an ADIRS computer, the ADIRS computer in communication with the second server through a respective one of the plurality of primary data transmission links and in communication with the first server through a respective secondary data transmission link, such that the request for information from the at least one aeronautical data base is sent to the second server prior to sending a request to the first server over the respective secondary data transmission link.

* * * * *